June 5, 1928. 1,672,095
C. W. SCHACHT
IMPLEMENT FOR UPROOTING PLANTS
Filed May 6, 1926
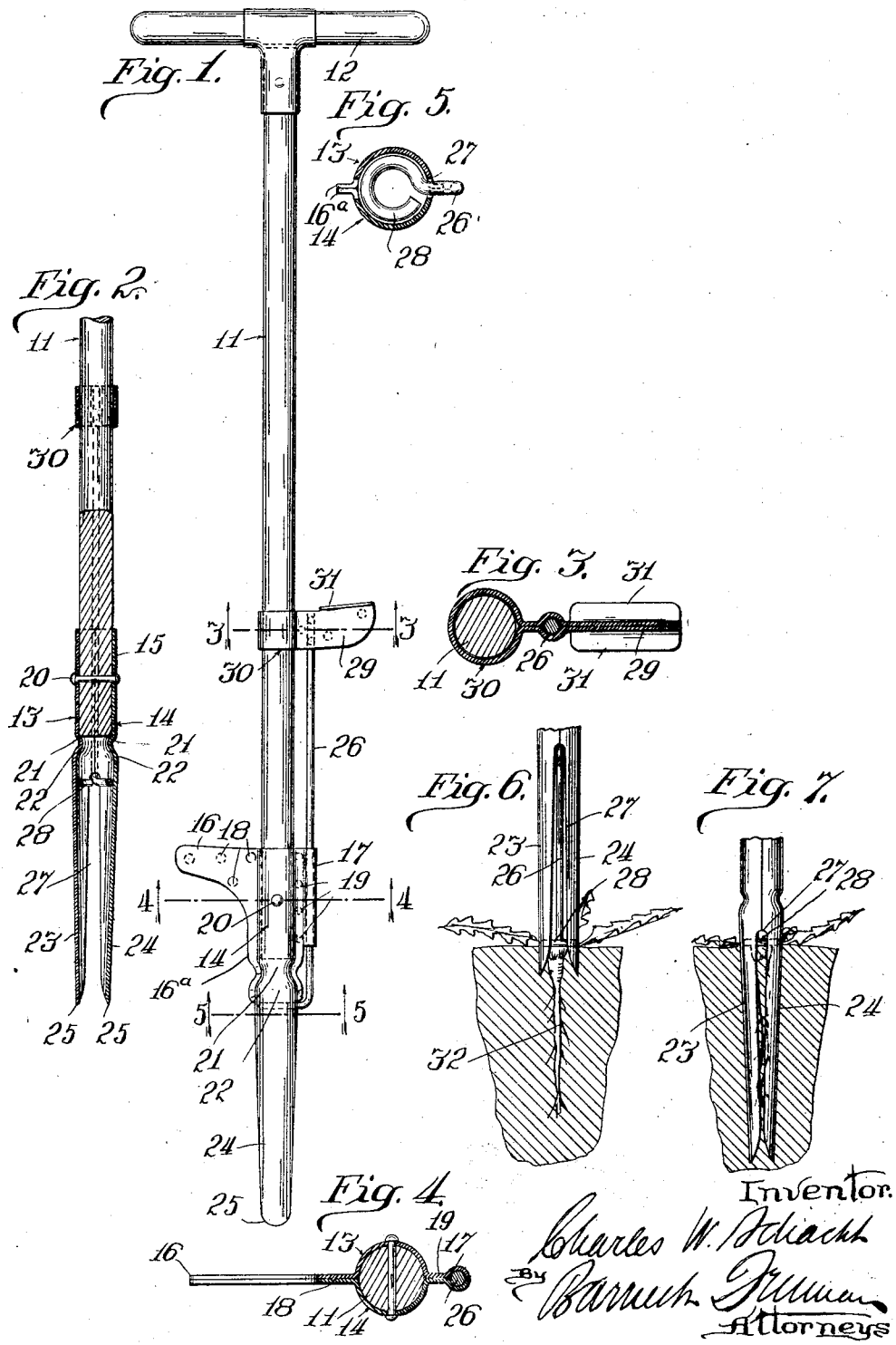
Inventor.
Charles W. Schacht
By Barnick Tillman
Attorneys Patented June 5, 1928.

1,672,095

UNITED STATES PATENT OFFICE.

CHARLES W. SCHACHT, OF CHICAGO, ILLINOIS, ASSIGNOR TO CORDUAN MANUFACTURING COMPANY, OF CHICAGO, ILLINOIS, A CORPORATION OF ILLINOIS.

IMPLEMENT FOR UPROOTING PLANTS.

Application filed May 6, 1926. Serial No. 107,061.

My invention relates to an implement for uprooting plants and the principal object of the invention is to provide a simple and effective device intended particularly as a weeder for removing dandelions or other weeds from lawns, although it is the intention to cover the invention by patent for all uses, of similar character, to which the device may be found suitable.

The invention is illustrated in a certain preferred embodiment in the accompanying drawing. As this structure will be found susceptible of modifications within the scope of the invention, it is my purpose to cover by patent all modified forms within the purpose and intent of the appended claims, as well as the specific and preferred embodiment of the invention shown in the drawing and to be described in the following specification.

In the drawing:

Fig. 1 is a view in elevation of the preferred embodiment of my invention.

Fig. 2 is a fragmentary longitudinal sectional view of the implement shown in Fig. 1.

Figs. 3, 4 and 5 are cross sectional views on lines 3—3, 4—4 and 5—5, respectively of Fig. 1.

Figs. 6 and 7 are fragmentary views illustrating the manner in which the device is used as a weeder.

Referring to the drawing, the operative parts of the implement are shown as mounted on a stock 11, which may be of wood or metal and is provided, preferably, with a hand piece 12. The weeding is accomplished by a pair of long relatively thin, flexible blades, which are spaced apart, concavo-convex, with the concave sides facing each other, and tapered and converged towards their ends, so that when the implement is thrust into the ground, around the tap root of a dandelion, for example, the pressure of the earth and the elasticity of the blades, which have been previously spread apart, as will be hereinafter described, will force the ends of the blades toward each other, compressing the core of earth around the root so that, in effect, a conical earth core is cut and collected by the implement. When the implement is pulled out of the ground, this earth core, together with the plant embedded therein, will, due to the tapered or conical configuration of the digging part of the implement, be pulled out of the earth with the implement. Preferably as stated a spreader is provided between the blades which, when pressed down, spreads the blades apart so that the plant and its earth core may be dropped or discharged. The plant, dandelion, for example, may be removed from the earth core, and the earth core put back into the hole from which it was taken.

The blades may be secured to the stock in any preferred manner. For reasons of economy of manufacture, the blades are formed as follows: Two pieces of sheet steel 13, 14, alike except that one is a right and the other a left, are pressed so that they form together a socket 15 for the end of the stock 11, a step or foot-piece 16 and a cylindrical guide 17 for the spreader rod to be hereinafter described; the metal pieces 13 and 14 being riveted or spot-welded together as indicated at 18, 19, being secured to the stock by a rivet 20. Below the socket 15 the sheet steel pieces 13, 14 are pressed inwardly to form a contracted neck 21, against which the lower end of the stock bears. The metal parts are bulged below the neck 21 as indicated at 22 and formed with flanges $16^a$, $16^a$, secured together, for example, by spot-welding. Below this portion of the implement the sheet steel pieces 13, 14 are in the form of long concavo-convex blades 23, 24, which are tapered, so that they converge toward their lower ends, the ends being rounded as indicated at 25, Fig. 1.

A rod or wire 26 extends through the guide 17 and is bent so as to project into one of the slots 27 between the blades with its inner end circular in form as indicated at 28 to provide a spreader for the blades. That is, the spreader 28 is of such diameter that when it is forced downwardly between the blades it spreads them to a certain extent. The upper end of the rod 26 is anchored between the projecting ends 29 of a band 30 slidably arranged on the stock. The projecting ends 29 of the band are preferably formed on their upper edges with flanges 31 which provide together a footpiece or step.

Operation: The implement is thrust into the ground with the blades one on each side of the plant to be uprooted. The spreader may be in the upper position as indicated in Figs. 1 and 2 but is preferably in the position indicated in Fig. 6, in which it acts to spread the blades apart. In Figs. 6 and 7, the dandelion root is designated by numeral 32. Assuming that the device is operated as indicated in Figs. 6 and 7, the forcing of the implement into the ground pushes up the spreader so as to release the blades 23, 24 which move toward each other because of their elasticity and are furthermore forced one toward the other because of the pressure of the earth against their tapered outer surfaces. This action is illustrated in Fig. 7. The implement is then pulled out of the ground, carrying with it the root of the plant and a tapered or conical core of earth surrounding the root. As the blades come out of the ground they tend to spring apart to a certain extent, but not enough to release the plant root and earth core. After the implement has been completely withdrawn from the ground, the user places his foot on the footpiece 31 so as to force the spreader 28 which acts also as an ejector, toward the outer ends of the blades. The plant and earth core are thus ejected. The core will ordinarily be quite firm and compact, so that, if desired, the plant may be removed therefrom and the earth core with any grass plant that it may contain, put back into the hole left by the implement. The spreader will now be at the outer end of the blades and the implement consequently in readiness for another weeding operation. It will be seen that the spreader and ejector is operated in one direction by the footpiece 31 and in the other direction by forcing the implement down into the ground around the plant root to be removed.

I claim:

1. An implement for uprooting plants comprising a stock, a pair of spaced concavo-convex spring metal blades rigidly attached to the stock and rounded at their ends, which are convergent so that when the implement is thrust into the ground, the blades are forced toward each other, and a spreader located wholly in the space between said blades which is movable lengthwise of the blades to force the outer ends of said blades apart under tension, which is adapted to bear against the ground allowing the blades to come together when the blades are thrust into the ground.

2. An implement comprising a stock and a pair of spaced concavo-convex metal blades tapering and normally convergent toward their ends, whereby when the implement is thrust into the ground the ends of the blades are forced toward each other to compress the root and core of earth around the same, a spreader slidably arranged between the blades to spread them from their normal convergent positions and an operating rod for the spreader guided on said stock, and a footpiece on the operating rod and a footpiece on the stock.

3. An implement comprising a stock, two pieces of sheet metal formed at their upper ends to provide a socket for the end of the stock, an outwardly projecting footpiece on one side of the socket and a cylindrical guide on the other end of the socket, the lower end of said sheet metal pieces being formed to provide a pair of concavo-convex tapered spaced blades, a rod extending through said guide, the lower end of which projects into the space between the blades and is bent into the form of a circular spacer, a slide ring on the stock to which said rod is attached and a hook piece on said ring.

4. An implement for uprooting plants comprising spring blades converging in the direction of their outer ends, and a plant ejecting and spreading device movable lengthwise of the blades for flexing the blades to spread their outer ends apart which device is adapted to remain between the outer ends of the blades, keeping them spread apart under tension, and to bear upon the ground allowing the blades to come together as they are thrust into the ground.

5. An implement for uprooting plants comprising a single pair of spaced spring blades having cocavo-convex configuration in cross section and converging in the direction of their outer ends, and a plant ejecting and spreading device movable lengthwise of the blades for flexing the blades to spread their outer ends apart which device is adapted to remain between the outer ends of the blades, keeping them spread apart under tension, and to bear upon the ground allowing the blades to come together as they are thrust into the ground.

6. An implement comprising a stock and a pair of spaced concavo-convex spring metal blades tapering and normally convergent toward their ends, whereby when the implement is thrust into the ground the ends of the blades are forced toward each other to compress the root and core of earth around the same, a spreader slidably arranged between and entirely within the space between the blades to spread the outer ends of the blades apart under tension, which device is adapted to bear upon the ground and allow the blades to come together when they are thrust into the ground, and an operating rod for the spreader guided on the outside of said stock having a connection with the spreader extending through one of the spaces between the blades.

CHARLES W. SCHACHT.